United States Patent [19]
Holden

[11] Patent Number: 4,655,621
[45] Date of Patent: Apr. 7, 1987

[54] COMBINATORIAL KEYBOARDS WHICH ENCODE CHARACTERS AND A SPACE

[76] Inventor: Richard Holden, 71, Lynton Road, Chesham, Buckinghamshire, England

[21] Appl. No.: 643,007

[22] Filed: Aug. 21, 1984

[30] Foreign Application Priority Data

Aug. 23, 1983 [GB] United Kingdom ............... 8322579

[51] Int. Cl.[4] ............................................. B41J 5/06
[52] U.S. Cl. ................................. 400/100; 400/472; 400/489; 340/365 S
[58] Field of Search .................. 400/100, 87, 88, 101, 400/102, 472, 482, 484, 485, 486, 489, 109, 91, 325; 340/365 R, 365 C, 709, 711, 365 S; 178/17 C; 235/145 R

[56] References Cited

U.S. PATENT DOCUMENTS

| | | | |
|---|---|---|---|
| 2,031,017 | 2/1936 | Tevis | 400/101 |
| 3,428,747 | 2/1969 | Alferieff | 400/473 |
| 3,507,376 | 4/1970 | Kafafian | 400/87 |
| 3,929,216 | 12/1975 | Einbinder | 400/109 |
| 3,945,482 | 3/1976 | Einbinder | 400/109 |
| 3,970,185 | 7/1976 | Shelton | 400/100 |
| 4,067,431 | 1/1978 | Whitaker | 340/365 R |
| 4,333,097 | 1/1982 | Buric et al. | 340/365 R |
| 4,458,238 | 7/1984 | Learn | 340/365 S |
| 4,467,321 | 8/1984 | Volnak | 340/365 R |

FOREIGN PATENT DOCUMENTS

| | | | |
|---|---|---|---|
| 308048 | 9/1918 | Fed. Rep. of Germany | 400/489 |
| 1810119 | 6/1970 | Fed. Rep. of Germany | 340/365 S |
| 53-142132 | 12/1978 | Japan | 340/709 |
| 1545406 | 5/1979 | United Kingdom | 340/365 R |
| 2076743 | 12/1981 | United Kingdom | |

OTHER PUBLICATIONS

*IBM TDB;* "Digital X Typewriter Keyboard"; D. L. Conway; vol. 18; No. 12; pp. 4187-4190; May 1976.
*IBM TDB;* "Easy to Learn Programmable Keyboard"; R. E. Bacon; vol. 24, No. 5, p. 2465; Oct. 1981.
*IBM TDB;* "Kana Keyboard w/Palm Rest"; A. Uchiyama; vol. 25; No. 9; pp. 4915-4916; Feb. 1983.
"Standard Typewriter v. Chord Keyboard"; R. Conrad et al; *Ergonomics;* pp. 77-88; vol. 8.
"A Ten-Key Typewriter"; E. T. Klemmer; *IBM Research Memorandum;* RC-65; Nov. 1958.
"Evaluation of an 8-Key Word-Writing Typewriter; G. R. Lockhead et al; *IBM Research Memorandum;* RC-180; Nov. 1959.

*Primary Examiner*—Charles A. Pearson
*Assistant Examiner*—David A. Wiecking
*Attorney, Agent, or Firm*—Rosen, Dainow & Jacobs

[57] ABSTRACT

A keyboard for a typewriter or a computer comprises two groups of keys for operation by the digits of the two hands of an operator. Each group has five home keys, and also some non-home keys, arranged in continuous rows. A decoder is provided for decoding the operation of the keys so that operation of each individual home key of the first group signals a respective vowel and simultaneous operation of a home key of the first group and a home key of the second group signals a consonant. Additional rows provide for output of a character and a space.

3 Claims, 33 Drawing Figures

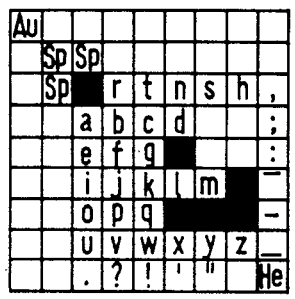
FIG.10.
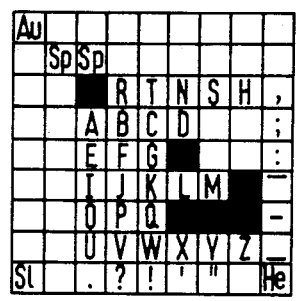
FIG.11.
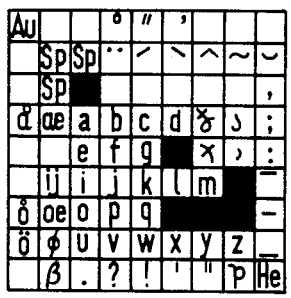
FIG.12.
FIG.13.
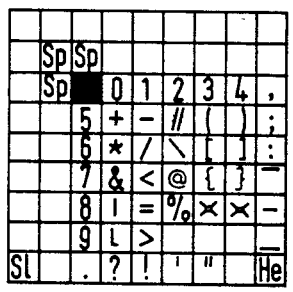
FIG.14.
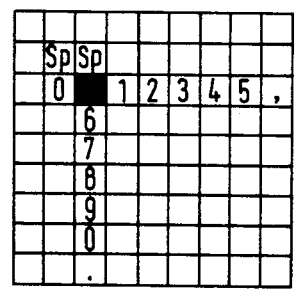
FIG.15.

BLOCK 1 — SHIFT

BLOCK 2 — ACCUMULATE

BLOCK 3 — IMMEDIATE REPEAT

BLOCK 4-DEFERRED OUTPUT

TABLE 1

| Total | Little | Ring | Middle | Index | Thumb (Addn) | LEFT Thumb (Rotn) | RIGHT Thumb (Rotn) | Thumb (Addn) | Index | Middle | Ring | Little | Total |
|---|---|---|---|---|---|---|---|---|---|---|---|---|---|
| 56.9 | 7.8 | 6.8 | 9.3 | 11.6 | 10.2 | 11.2 | 13.5 | 7.8 | 11.9 | 9.5 | 7.1 | 7.3 | 57.1 |

GRAND TOTAL 114.0

TABLE 2

|  | Total | Little | Ring | Middle | Index | Thumb (Addn) | LEFT Thumb (Rotn) | RIGHT Thumb (Rotn) | Thumb (Addn) | Index | Middle | Ring | Little | Total |
|---|---|---|---|---|---|---|---|---|---|---|---|---|---|---|
| Invention | 49.9 | 6.8 | 6.0 | 8.2 | 10.2 | 8.9 | 9.8 | 11.8 | 6.8 | 10.4 | 8.3 | 6.2 | 6.4 | 50.1 |
| QWERTY | 55.2 | 6.2 | 5.9 | 13.9 | 17.2 | 0.0 | 12.3 | 12.3 | 0.0 | 16.2 | 5.4 | 9.5 | 1.0 | 44.4 |
| Dvorak | 45.3 | 6.1 | 6.6 | 9.6 | 10.7 | 0.0 | 12.3 | 12.3 | 0.0 | 13.9 | 11.5 | 10.1 | 6.7 | 54.5 |
| Strength | 50 | 5 | 8 | 10 | 11 | — | 16 | 16 | — | 11 | 10 | 8 | 5 | 50 |
| Speed | 48 | 10 | 12 | 13 | 13 | — | — | — | — | 14 | 14 | 13 | 11 | 52 |

|   | English | French | German | Italian | Spanish |
|---|---|---|---|---|---|
| A | 6.6 | 7.8 | 4.8 | 9.7 | 9.8 |
| E | 10.3 | 11.5 | 13.4 | 9.8 | 11.7 |
| I | 6.0 | 7.0 | 6.8 | 9.4 | 5.2 |
| O | 6.3 | 4.2 | 2.1 | 7.6 | 7.4 |
| U | 2.2 | 5.1 | 4.0 | 2.5 | 3.5 |
| TOTAL VOWELS | 31.4 | 35.6 | 31.1 | 39.0 | 37.6 |
| TOP FIVE CONSONANTS | 28.4 | 29.7 | 29.8 | 26.4 | 26.6 |
| SUBTOTAL | 59.8 | 65.3 | 60.9 | 65.4 | 64.2 |
| REMAINING CONSONANTS AND PUNCTUATION | 22.6 | 17.5 | 23.1 | 18.0 | 19.1 |
| SPACE | 17.6 | 17.2 | 16.0 | 16.6 | 16.7 |
| TOTAL | 100.0 | 100.0 | 100.0 | 100.0 | 100.0 |

TABLE. 3.

|     |   |   |   |   |   |   |   |   |   |   |
|-----|---|---|---|---|---|---|---|---|---|---|
| I   | 1 | 2 | 3 | 4 | 5 | 6 | 7 | 8 | 9 | 0 |
| II  | 0 | 1 | 2 | 3 | 4 | 5 | 6 | 7 | 8 | 9 |
| III | 8 | 6 | 4 | 2 | 0 | 1 | 3 | 5 | 7 | 9 |
| IV  | 0 | 9 | 8 | 7 | 6 | 1 | 2 | 3 | 4 | 5 |
| V   | 9 | 8 | 7 | 6 | 5 | 0 | 1 | 2 | 3 | 4 |

TABLE. 4.

IMMEDIATE REPEAT TRUTH TABLE

| SHIFT | LEFT TH | TH | TH | FINGERS | RIGHT TH | TH | TH | FINGERS |
|---|---|---|---|---|---|---|---|---|
| ALPHA | 0 | 1 | 0 | 1 | 0 | 0 | 0 | 0 |
|  | 0 | 0 | 0 | 0 | 0 | 1 | 0 | 1 |
|  | 0 | 1 | 0 | 1 | 0 | 1 | 0 | - |
|  | 0 | 1 | 0 | - | 0 | 1 | 0 | 1 |
| NUM | 0 | 0 | 0 | 0 | 0 | 1 | 0 | 1 |
| CTRL | 0 | 1 | 0 | 1 | 0 | 0 | 0 | 0 |
|  | 0 | 1 | 0 | 1 | 0 | 1 | 0 | - |
|  | 0 | 1 | 0 | 1 | 0 | 0 | 1 | - |
|  | 0 | 0 | 1 | 1 | 0 | 0 | 0 | 0 |
|  | 0 | 0 | 1 | 1 | 0 | 1 | 0 | - |
|  | 0 | 0 | 1 | 1 | 0 | 0 | 1 | - |
|  | 0 | 0 | 0 | 0 | 0 | 1 | 0 | 1 |
|  | 0 | 1 | 0 | - | 0 | 1 | 0 | 1 |
|  | 0 | 0 | 1 | - | 0 | 1 | 0 | 1 |
|  | 0 | 0 | 0 | 0 | 0 | 0 | 1 | 1 |
|  | 0 | 1 | 0 | - | 0 | 0 | 1 | 1 |
|  | 0 | 0 | 1 | - | 0 | 0 | 1 | 1 |
|  | 0 | 0 | 1 | 1 | 1 | 0 | 0 | 0 |

TABLE. 5.

COMBINATORIAL KEYBOARDS WHICH ENCODE CHARACTERS AND A SPACE

BACKGROUND OF THE INVENTION

1. Field of the Invention

The present invention relates to keyboards. Such keyboards may be used with any machines for communicating, storing, processing or retrieving representatives of information, such as telegraphs, typewriters, type composing machines, cyphering machines, calculators and computers. Such a keyboard is particularly suitable for use with modern types of computers having visual display units and full screen editing facilities. Such computers are being increasingly used by originators of information without the intervention of specialist keyboard operators.

2. Description of the Prior Art

When the typewriter became a commercial success in the 1890's after a long history of experiment, a variety of mechanisms and keyboard layouts were in use. Some machines used the type-bar mechanism which later became universal for wholly mechanical typewriters. Because the early type-bar mechanisms were liable to jam if adjacent keys were struck in quick succession, the letters were arranged on the keyboard to avoid such sequences. The resulting so-called "Universal" keyboard, now generally known as QWERTY from its letter sequence, is inefficient in human terms, as only 50% of letters struck lie on the most used row, and the fingers must make many reaches to the other rows. Machines having type-wheel or type-sector mechanisms were able to use the somewhat better 'Ideal' arrangement, having on one row the ten most frequent letters accounting for 70% of letters struck. Nevertheless, the type-bar mechanism proved more effective overall and it gained a large share of the market. A common standard keyboard layout proved a commercial necessity, and the 'Ideal' and other minority layouts fell out of use even though with detailed mechanical improvements type-bar jams ceased to be a problem.

The QWERTY layout originated in the United States. With minor modifications it has become the standard for all languages written with the Latin alphabet. A few gross differences in letter frequency have been accommodated, and each nationality has made some special provision for accents, diphthongs and letters not used in English. The 20 or so European languages written with essentially the Latin alphabet require a total of some 11 accents and 8 additional letters or diphthongs. Printer's work requires a variety of special marks in addition to normal punctuation. Particular subjects may require the Greek alphabet, chemical symbols or other extensions of the character set.

An ordinary typewriter keyboard providing the Latin alphabet, the numbers, a limited set of punctuation marks and special symbols, and a few machine control functions has some 46 keys. With the advent of electronic computers the QWERTY keyboard has been enlarged by the addition of a ten key numerical keypad as used on calculators, duplicating the ten numeric keys on the top row of the typewriter layout to increase the speed of numeric data entry, at least four cursor movement keys, and a growing number of other machine function keys having fixed or program assigned meanings. Leading computer manufacturers are now supplying universal word and data processing keyboards having over 100 keys, and the trade-off between function keys and displayed function lists or menus is becoming a topic of concern to systems designers.

Many inventors have endeavoured to improve the typewriter keyboard layout. The best known work is that of Dvorak et al, who described in 1932 a letter arrangement optimised in terms of carefully chosen criteria including letter frequencies, diagram frequencies, and the relative strengths and agility of the fingers. There are several more recent proposals for performance optimised keyboards, for example one due to X of Canada. Keyboards in straight alphabetic sequence have also been tried, but found slower than QWERTY even for persons with no typing experience, and are used only where ease of understanding is paramount, as with military field enciphering machines and communication devices for the elderly handicapped. Other inventors have worked on the shape of the keyboard, variously proposing key rows curved to match the natural arc of the fingertips, multiple key rows disposed in doubly curved bowl shapes to ease the reaches, thumb keys oriented nearly at right angles to the finger keys to better exploit the strength and agility of the thumbs, and a general outward tilt of the two sides of the keyboard for the comfort of the wrists. Some have worked on both shape and letter arrangement. Optimal keyboards have been proposed for several European languages. The Maltron keyboard now on the British market has an ergonomic shape and performance optimised layout. Increased speed, reduced fatigue, and reduced training time are claimed for it. The gain in speed from any of these performance optimised keyboards appears limited, and is tentatively estimated in Siebel (1972) at not more than 10%.

Where national keyboards may be used for foreign correspondence, there is a recognised problem of extending the national layout to accommodate additional characters. The needs of multi-lingual secretariats have lead to proposals for standard European keyboards, which cannot be optimal for any single language.

The chief difficulty with the QWERTY and other keyboards having one key for each character and machine function is the amount of training required to achieve proficient operation. The speed of 40-60 words per minute expected of a competant typist requires so-called 'touch-typing', that is reading the manuscript while simultaneously operating the keyboard with only tactile and audible feedback. To do this, the stimulus-response bonds which link letters and common groups of letters to the finger movements which key them must be thoroughly learnt. These bonds are sequence dependent, and the reaches over the rows make them complex. The apparently random order both of the QWERTY keyboard and of those based on letter frequency leads unavoidably to the worst kind of boring rote learning, devoid of principle or interest. Using traditional methods of teaching, some 60 hours of class training are required to achieve a basic competance, though programmed learning methods may reduce this somewhat. Untrained persons such as the journalists, authors, professionals and managers who now increasingly use computers without the intervention of specialist keyboard operators are unable to key at more than about 15 words per minute, even with much practical experience, because they become fixed in bad habits. Their keying is slower than handwriting, which commonly attains 20-40 words per minute. Thus work not requiring immediate response from the computer is still written out in longhand and sent to specialist keyboard operators. Work which does require immediate response is done less efficiently than it might be. Status conscious persons already reluctant to undertake a task they associate with persons of lower status are additionally inhibited by the fact that their performance is so much worse than that of these lower status persons. As professionals and managers are generally not willing to undergo formal keyboard training, the computer is of less benefit to them than it could be. With the expected wired society, this problem will extend to the community at large.

The alternative to a keyboard having one key for each character and machine function is one having fewer keys, used singly or in combination to signal the full character set. Keyboards of this type were in use for special purposes before the normal typewriter keyboard. The Baudot telegraph code of 1874 was signalled by a five key keyboard operated by the stronger fingers of both hands. Braille embossing machines were developed in mid-century and a common form with six code keys and a space key established in the 1890's. With a small number of keys, the problem of the reaches is eliminated, but the problem of remembering the codes arises. Several inventors have aimed to reduce this by codes based on letter shape. In 1975, Endfield and Rainey patented a keyboard for one hand on which between one and five keys are struck in a pattern suggesting a particular letter. This device is now on the market as the Microwriter. Experience has shown that a user can teach himself, and that a speed exceeding that of handwriting is reached after a few weeks. The tricks of style which aid memory are however weak for some letters and for figures and special characters. Also, speed is limited by the manual dexterity required. Using the Dewey frequency data, a weighted average of 1.82 keys must be pressed per letter, space or punctuation mark. The fingerings are governed by the need to support some resemblence or trick of memory, and many of them are relatively slow and awkward according to the rankings of Ratz and Ritchie and of Siebel (1962). Machines having 20 or 24 keys are also known and are used for courtroom shorthand recording at twice the speed of a QWERTY keyboard, but are specific to a phonetic encoding requiring long training.

A particularly simple encoding is afforded by a keyboard having a group of keys for each hand, and operated by striking one key of each group simultaneously. Such codes may be represented by a matrix in which one hand defines the column and the other defines the row. The Cooke and Wheatstone electric telegraph of 1837 had two groups of six keys which caused magnetic needles to indicate the axes of a matrix. The Pratt typewriter of 1866 had two groups of six keys giving 36 characters, and later two groups of eight keys giving 64 characters. Vondra, Tevis, and Boni proposed similar mechanical typewriters, and Linhares and Colombo have proposed electric versions. Kafafian includes a similar electric keyboard in his schemes for the handicapped. Electric keyboards with two key coding were investigated in depth around 1960 for use in applying postcodes to mail, and have since been reported in use. In a small experiment, postmen acquired basic competance on the code keyboard in 32 hours compared with 80 hours for the QWERTY keyboard, and were consistently faster on the code keyboard up to the end of the experiment at 100 hours of training. These results were obtained even though the training for the new keyboard was inevitably less expert than for the QWERTY keyboard, and the matrix layout logical but not particularly memorable. Siebel (1972) has estimated that such keyboards have a speed potential of 150% of the QWERTY keyboard, and advocates the use of chord keyboards by those not needing to be trained in QWERTY. He also refers to work on an eight key typewriter on which single keys were struck for common letters, two key combinations for the remaining characters, and combinations of up to seven keys for common words. There have been many proposals for word writing typewriters, none of practical value.

The cursor movement keys of the extended QWERTY keyboard give very limited movement capability. A single press moves the cursor one place up, down or sideways, as a king moves in chess. A press and hold brings into action after a delay of about half a second an auto-repeat function which moves the cursor at a fixed, rather slow speed in the chosen direction, but still only moving as a rook. Moves between two arbitrary points have to be made as a series of zig-zags. The cursor cannot move as a queen. The fixed auto-repeat speed, necessarily a compromise, is timewasting on long cursor moves and yet fast enough to lead to overshoots if the user is not very careful. To overcome these limitations, auxiliary devices such as the mouse or puck used to generate XY coordinates in graphics work are being adopted for character work. The ease of cursor movement with these devices is particularly important in supporting machine languages which exploit to the full the human preference for communicating by showing rather than telling. These auxiliary devices have however the disadvantage in textual work that one hand must be moved frequently between the keyboard and the mouse or other device, which is disorienting and timewasting. The fixed speed auto-repeat is also an irritant when entering multiple space characters to set out text. The mouse or puck does not help here.

A further disadvantage of the conventional keyboard is the high risk of accidentally initiating computer action by pressing the 'Enter' key before one means to, due to its placement at the front of the keyboard next to one of the shift keys. In other machines, considerable care is taken to avoid accidental operation, for example by placing a key a little out of the way, or by recessing or hooding it. On presses and guillotines there are commonly two start buttons placed well apart which must be pressed simultaneously, thus ensuring that both of the operator's arms are in safe positions.

Actuation of the keys of an ordinary electro-mechanical typewriter requires significant force and displacement, and the device makes considerable noise. With an electronic keyboard this is not necessary. It is found however that touch typists still desire a keyboard requiring significant operating force and displacement, and making some noise. In part this is because fingers moving rapidly over the reaches acquire considerable momentum, which then has to be destroyed and reversed, in part it is because with their eyes on the copy they require tactile and audible confirmation that a signal has been registered by the machine. Authors and others originating information in their heads are generally not touch typists, and must look at the keyboard, so that they also cannot obtain immediate visual feedback from the visual display unit. The membrane keyboards now used to reduce the cost of small personal computers have attracted much criticism because it is not possible to tell by the feel of the keyboard whether a signal has registered. Sound generators have been used to overcome this problem. With a chord keyboard requiring no rapid reaches, and on which information originators could readily learn to touch-type, so that they became free to watch the display for visual confirmation as one watches the paper when writing by hand, audible feedback should not be necessary beyond the initial learning stage, and slight or zero key displacement may be acceptable or preferred if tactile feedback of finger to key engagement is given and signal registration is reliable. Silent operation then becomes practical.

Information relevant to the design of electronic keyboards may be obtained from the known art of the design of wind instruments of music. In both, in contrast with non-electric typewriters and musical instruments such as the piano, the fingers are required only to control the machine, not to supply the power which drives it. Quantz and all later writers agree that the fingers should be curved in a moderate arch, and should strike the keys with their pads, not with their tips. This is impossible with typewriter keyboards having multiple rows of keys. On wind instruments all unnecessary motion is avoided, and the least possible force and displacement are preferred in the interests of speed. Keys are not used because they feel better than open holes, which do not give under the fingers, but solely because there are more notes in the octave than fingers on the hand. The occasional proposals in the data processing art for thumb keys operating in a plane differing from that of the finger keys are supported by the flute, oboe, clarinet and other wind instruments on which the thumb works in opposition to the fingers, and by the French horn on which it works at right angles. The agility of the thumb is best evidenced by the bassoon, on which it is required to operate up to nine keys singly or in combination. On all wind instruments the thumb is expected to work with the same speed and precision as the fingers.

PRIOR ART REFERENCES
PATENT LITERATURE

British

| Year | Number | Name |
|---|---|---|
| 1937 | 7,390 | Cooke W. F. and Wheatstone C. |
| 1866 | 3,163 | Pratt J. |
| 1884 | 9,048 | Thompson W. P. |
| 1897 | 10,672 | Anderson G. K. |
| 1914 | 2,809 | Burboa J. G. H. |
| 1923 | 213,485 | Hall E. C. |
| 1923 | 231,397 | Vondra K. |
| 1924 | 237,197 | Fischer O. and Naamloze |
| 1927 | 293,990 | Allen C. F. |
| 1929 | 330,476 | Marloth K. |
| 1933 | 409,138 | Dvorak A. and Dealey W. L. |
| 1938 | 510,548 | Muther A. |
| 1949 | 700,083 | Panocha A. |
| 1950 | 698,327 | Boni A. |
| 1963 | 966,181 | Creed & Co |
| 1964 | 1,016,993 | IBM |
| 1974 | 1,424,306 | X of Canada |
| 1975 | 1,496,522 | Endfield C. and Rainey C. J. |
| 1978 | 2,000,083 | Malt L. |
| 1980 | 2,041,295 | Marsan C. |
| 1980 | 2,076,743 | Winkler E. E. |

United States

| Year | Number | Name |
|---|---|---|
| 1933 | 1,906,196 | Linhares A. |
| 1936 | 2,031,017 | Tevis R. |
| 1945 | 2,375,526 | Colombo O. |
| 1970 | 3,507,376 | Kafafian H. |
| 1970 | 3,718,991 | Kafafian H. |
| 1973 | 3,929,216 | Einbinder A. |
| 1976 | 3,945,482 | Einbinder A. |
| 1979 | 4,180,337 | Otey F. B. |
| 1982 | 4,332,493 | Einbinder A. |

OTHER LITERATURE

| Author | Title |
|---|---|
| Alder M. H. (1973) | The Writing Machine |
| Alden D. G. et al | Keyboard Design and Operation: A Review of the Major Issues Human Factors 1972, 14(4), 275-293 |
| Beeching W. A. (1974) | Century of the Typewriter |
| Carse A. (1965) | Musical Wind Instruments |
| Conrad R. and Leonard J. A. | Maintenance of High Accuracy Without Augmented Feedback Nature Vol 199, No 4892, 3 August 1963 |
| Conrad R. and Longman D. J. A. | Standard Typewriter versus Chord Keyboard - An Experimental Comparison Ergonomics Vol 8, 1975, 77-88 |
| Crooks M. (1965) | Touch Typewriting for Teachers |
| Dewey G. (1923, 1970) | Relative Frequency of English Speech Sounds |
| Hirsch R. S. | Procedures of the Human Factors Center at San Jose IBM Systems Journal Vol 20, No 2, 1981 |
| Nakaniski A. (1980) | Writing Systems of the World |
| Quantz J. J. (1752) | On playing the Flute |
| Ratz H. C. and Ritchie D. K. | Operator Performance on a Chord Keyboard J Applied Psychology 1961 Vol 45, No 5, 303-308 |
| Rendall F. G. (1971) | The Clarinet |
| Siebel R. | Performance on a Five-Finger Chord Keyboard J Applied Psychology 1962 Vol 46, No 3, 165-169 |
| Siebel R. | Data Entry Devices and Procedures in Van Cott H. P. and Kinkade R. G. (eds) (1972) Human Engineering Guide to Equipment Design |
| Spencer W. (1958) | The Art of Bassoon Playing |
| West L. J. (1969) | Acquisition of Typewriting skills |
| Klemmer E. T. | A Ten-Key Typewriter IBM Research Memo RC-65 (1958) |
| Lockhead G. R. and Klemmer E. T. | An Evaluation of an 8-Key Word-Writing Typewriter IBM Research Memo RC-180 (1959) |

SUMMARY OF THE INVENTION

According to the invention, there is provided a keyboard, comprising a plurality of keys arranged in first and second groups for operation by the digits of respective hands of an operator, each group comprising or including five home keys arranged in a first single continuous row for respective digits of the hand, and means for decoding operation of the keys to provide signals representative of characters, the decoding means being arranged to produce a signal representative of each of the vowels upon operation of a respective single home key of the first group and to produce a signal representative of each of at least some of the consonants upon simultaneous operation of a home key of the first group and a home key of the second group.

Preferably, the decoding means is arranged to produce a signal representative of at least some of the consonants upon simultaneous operation of the home key of the first group corresponding to the vowel preceding the respective consonant in alphabetical order and a home key of the second group.

Preferably, the first and second groups of keys are arranged to be operated by the left and right hands, respectively.

Preferably, the home keys of the first group corresponding to the vowels a, e, i, o and u are arranged to be operated by the thumb and the index, middle, ring, and little finger, respectively. Preferably, the decoding means is arranged to provide signals representing five common consonants or other characters (including space) upon operation of respective single home keys of the second group. Preferably, the decoding means is arranged to produce a signal representative of each of the remaining consonants upon simultaneous operation of the key of the first group corresponding to the alphabetically preceding vowel and the respective home key of the second group corresponding to the relative position of the consonant with respect to the remaining consonants following the vowel and taken in order from the thumb to the little finger.

Preferably, the decoding means is arranged to produce a signal representative of an accented letter upon simultaneous operation of the key or keys for selecting the non-accented letter and a further key or keys.

Preferably, at least one of the groups of keys includes a non-home key for operation by the thumb, and the decoding means is arranged to produce a signal representative of a space in response to operation of the non-home thumb key. Preferably, the decoding means is arranged to produce signals representative of space repeatedly in response to simultaneous operation of the non-home thumb key and at least one finger key of the same group, the frequency of repetition depending on the finger key or keys operated.

Preferably, each of the first and second groups of keys includes a non-home key for operation by the thumb, and the decoding means is arranged to produce a signal representative of a space in response to simultaneous operation of both the non-home thumb keys. Preferably, the decoding means is arranged to produce signals representative of space repeatedly in response to simultaneous operation of both the non-home thumb keys and of at least one finger key, the frequency of repetition depending on the finger key or keys operated.

Preferably, each of the first and second groups of keys includes a non-home key for operation by the little finger, and the decoding means is arranged to produce signals representative of a period (full stop) and comma in response to operation of the respective non-home little finger keys.

In one embodiment, the keyboard includes at least one shift key arranged to be operated by the heel of the hand and the decoding means is arranged to perform a shift function in response to operation of the shift key or keys. In another embodiment, the keyboard includes at least one shift key arranged to be operated by the heel of the hand and the decoding means is arranged to perform a shift function in response to release of the shift key or keys.

Preferably, the decoding means is arranged to produce a signal representative of a numeric digit in response to operation of a respective home key when in numeric shift. Preferably, the decoding means is arranged to produce a signal representative of zero upon operation of a non-home thumb key disposed adjacent to a home thumb key. Preferably, the decoding means is arranged to produce multiple signals representative of zero upon simultaneous operation of the non-home thumb key and at least one finger key of the same group, the number of zeroes produced depending on the finger key or keys operated.

Preferably, the decoding means is arranged to produce signals representative of cursor movement in response to operation of a home thumb key or an adjacent non-home thumb key when in control shift, the thumb keys of one hand signalling horizontal movement and the thumb keys of the other hand signalling vertical movement. Preferably, the decoding means is arranged to produce signals representative of cursor movement repeatedly in response to simultaneous operation of a thumb key and at least one finger key of the same group, the frequency of repetition depending on the finger key or keys pressed. Preferably, the decoding means is arranged to produce signals representative of cursor movement at an angle in response to simultaneous operation of one home thumb key or adjacent non-home thumb key of each group when in control shift, the thumb key operated in one group determining the direction of the horizontal component of the movement and the thumb key operated in the other group determining the direction of the vertical component of the movement.

Preferably, the decoding means is arranged to produce signals representative of cursor movement at an angle repeatedly in response to the simultaneous operation of a thumb key of each group and at least one finger key of each group, the thumb key and finger key or keys operated in one group determining the direction and speed, respectively, of the horizontal component of the movement and the thumb and finger key or keys operated in the other group determining the direction and speed, respectively, of the vertical component of the movement. Preferably, the decoding means is arranged to produce a signal representative of the 'Run' function in response to the simultaneous operation of a further non-home thumb key of each group when in the control shift, the further non-home thumb keys being disposed at the ends of the rows of keys in each group remote from the home thumb keys for operation by the extended thumbs.

Preferably, the keyboard is shaped to fit the natural curve of the hands at rest with the fingers curved in a moderate arc and the wrists straight. Preferably, the general planes of the keys for each hand are tilted outwards in order to reduce the angle of forearm pronation. Preferably, the or at least one thumb key of each group is disposed at an angle to the general plane of the finger keys of the respective group for operation by adduction of the thumb towards the palm of the hand. Preferably the home thumb key of each group is disposed substantially at right angles to the general plane of the finger keys of the respective group and non-home thumb keys of each group are disposed substantially parallel to the respective general plane, so that the home and adjacent non-home thumb keys may be operated from the same position of the thumb.

In one embodiment, each group of keys includes five additional keys arranged in a second single continuous row for operation by respective digits of the respective hand, and the decoding means is arranged to produce in response to operation of at least one key of the first and second rows, including at least one key of the second row, a signal representative of the same characters as in response to corresponding keys all of the first row, preceded or followed by a signal representative of the space character. In another embodiment, each group of keys includes at least one elongated key arranged to be operated by any of a plurality of digits of the respective hand, and the decoding means is arranged to produce, in response to simultaneous operation of at least one key in the first rows of keys and at least one of the elongated keys, a signal representative of the same character as in response to operation of the at least one key of the first rows only preceded or followed by a signal representative of the space character. In a further embodiment, each of at least the home keys of each group is provided with an additional distinct motion, and the decoding means is arranged to produce, in response to the additional distinct motion of at least one of the home keys, a signal representative of the same character as in response to operation of the same key combination without the additional motion preceded or followed by a signal representative of the space character.

It is thus possible to provide a keyboard which is easy to use and such that information originators can begin using a keyboard with a minimum of formal instruction, practical work develops their skill without any need for formal skill building training, occasional users can on each occasion of use quickly recover their former level of skill and users at any skill level experience minimal sense of fatigue. Experienced users can attain performance levels comparable with those of trained information originators using conventional keyboards.

It is also possible to provide a standard keyboard which can be efficiently used by a native speaker of any language written with the Latin alphabet to key his own or any other language of the group. It is further possible to provide an efficient keyboard for all character processing work including cursor movement and other machine control functions, so that auxiliary devices such as a mouse or puck are only required for graphics processing.

It is possible to reduce the size and weight of keyboards in order to improve portability and occupy less of the user's working surface, to reduce or eliminate the noise made by conventional keyboards, and to reduce manufacturing costs. It is also hoped that by increasing the proportion of information entered into machines by its originators, and decreasing the need for specialist keyboard operators, the invention may contribute towards the social objective of equality between all men and women.

In general terms any system for the communication of representations of information from the human brain to the internals of a machine must comprise a part of the brain engaged upon encoding the information representation into impulses acceptable to the machine, the nervous sytem, musculature and other anatomical features required to deliver the impulses to the machine, the parts of the machine formed to receive the impulses, and the parts of the machine which determine that a valid impulse or combination of impulses has been received and transform it into the form used in the internals of the machine. In the present case, the impulses are delivered by the hands to a keyboard and may be transformed into any internal code such as the ISO 7-bit coded character set for information processing interchange, or directly into the operations of an output mechanism as in a typewriter.

Modern learning theory stresses the importance of providing the mind of a machine operator with a coherant, easily remembered mental model of the workings of the machine, around which to build his detailed understanding and effective performance. A primary design objective of the machine is therefore to promote this mental model in the mind of the user, so that the outcome will be ease of use.

BRIEF DESCRIPTION OF THE DRAWINGS

The invention will be further described, by way of example, with reference to the accompanying drawings, in which:

FIGS. 5 to 21 illustrate in matrix form operation of keys of the keyboard for signalling characters and control functions;

Figures 5, 6, 7, 8, 9:
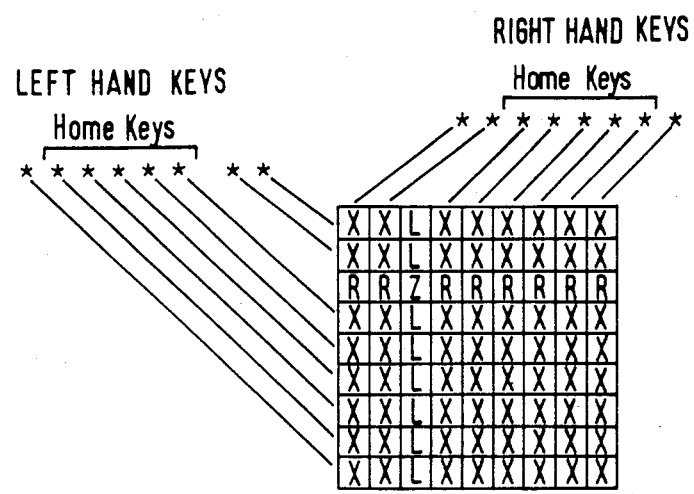

Table 1 shows the total loading on the fingers and thumbs obtained by summing the percentage frequencies of the letters, space, and punctuation marks across the rows and columns of the matrix of FIG. 8;

Table 2 compares the data of Table 1 with prior art keyboard data;

Table 3 shows selective frequency data for five European languages;

Table 4 shows possible arrangements of the ten arithmetic digits; and

Table 5 is a truth table used in association with the outline flowcharts of FIGS. 25-28.

DESCRIPTION OF THE PREFERRED EMBODIMENTS

Figure 1:
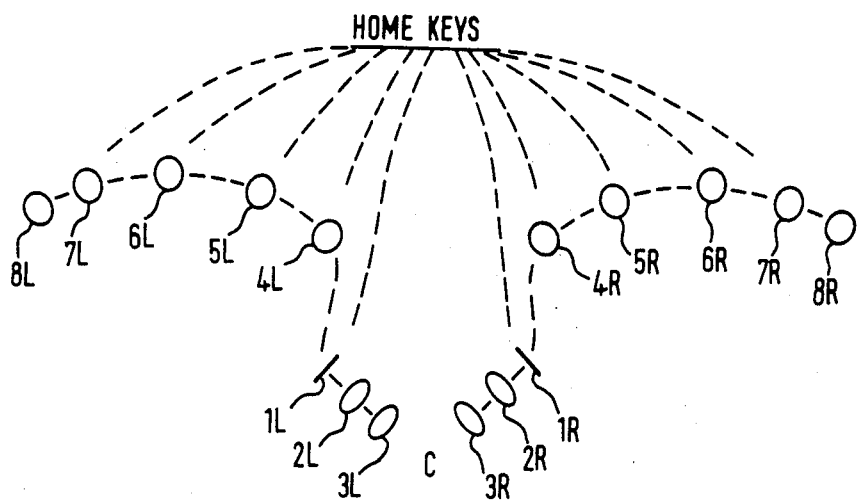
FIG. 1 is a diagrammatic plan view of a keyboard constituting a preferred embodiment of the invention.
Figure 1:
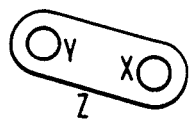
Figure 1:
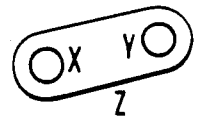
Figure 2:
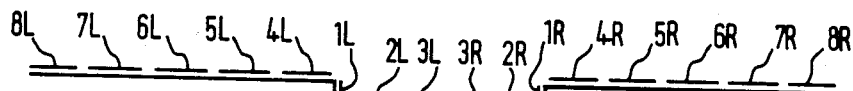
FIG. 2 shows diagrammatically a lateral cross-section of the keyboard of FIG. 1.

FIGS. 1 and 2 show a keyboard, constituting a preferred embodiment of the invention, having eighteen keys and shaped to fit the natural shape of the hands at rest with the arms converging on the keyboard and the wrists straight. Working outwards from the centre C of the keyboard, the first three keys on each side are intended to be operated by the thumbs, which have the greatest mobility of all the digits. The outermost key 1L, 1R of each group is placed substantially at right angles to the others of the group, so that the thumb may operate it or the middle thumb key 2L, 2R from the same initial position without loss of time, and so that the work is divided between two different muscle groups. In an efficient distribution of the required characters and machine functions across the keys, the innermost thumb key 3L, 3R of each hand will be more lightly loaded than the two outer keys 1L, 1R, 2L, 2R. The remaining digit keys resume the general orientation of the inner thumb keys 2L, 2R, 3L, 3R.

Continuing outwards from the thumb keys, the next three keys 4L, 5L, 6L, 4R, 5R, 6R on each side are intended to be operated by the index, middle, and ring fingers. These fingers have little lateral mobility and so operate only one key each. They will locate the hands at all times. The hands make no movements as a whole, and thus the problem of reaches is eliminated. The outermost two keys 7L, 8L, 7R, 8R on each side are intended to be operated by the little fingers, which have some lateral mobility. In accordance with ordinary typewriter usage, the five adjacent thumb and finger keys 1L, 4L, 5L, 6L, 7L, 1R, 4R, 5R, 6R, 7R of each hand operated by the unextended hand will be termed the "home" keys. FIG. 1 identifies these keys. In other embodiments of the invention, there may be a different number of digit keys, and some or all of the thumb keys may be substantially parallel to the finger keys, at right angles to them, or opposed to them at 180 degrees. The general planes of the finger keys for the two hands may be tilted outwards to reduce forearm pronation at any angle from zero degrees to substantially 90 degrees.

Figure 3:
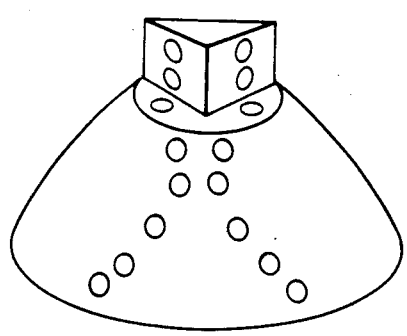
FIGS. 3 and 4 illustrate another embodiment of the keyboard.
Figure 4:
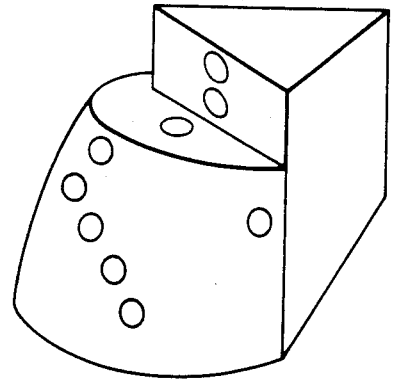

The thumb and finger keys are used to signal characters and machine functions. They may be used in any combination, including simultaneous use of the two little fingers. With QWERTY and similar keyboards, one or other little finger is always available to press a shift key, with the proposed keyboard other arrangements must be made. Shift locks in the encoding scheme are not adequate alone, requiring three keystrokes to signal a single capital letter preceded and followed by lower case letters. The preferred keyboard is therefore provided with two keys placed for operation by the heels of the hands. FIG. 1 shows these keys placed either for operation by the thenar eminences at at X, or for operation by the hypothenar eminences as at Y, or extending over the whole area of the heel of the hand as at Z. These keys are used as shift keys, and lights may be provided on the keyboard to indicate that the shifts are in effect, as is done with conventional keyboards. The shifts may be arranged as with conventional keyboards so that the unshifted condition with no shift key pressed gives the lower case alphabet. Alternatively the keyboard may be arranged so that the lower case alphabet is obtained with both shift keys pressed and the user may rest the heels of his hands on the keyboard for most of the time to relieve the weight of the arms as when handwriting. A hardware or software switch may be provided to reverse the action of the shift keys, enabling the user to rest the heels of his hands on the keyboard for most of the time or not as he pleases. Shift locks may be provided in the encoding scheme so that the user need only make momentary departures from his preferred way of holding his hands. FIGS. 3 and 4 show another preferred keyboard in which the spatial relationships between the left hand keys and the spatial relationships between the right hand keys remain as before, but the general planes of the hands are rotated outwards for the greater comfort of the wrists. Similar keyboards may be constructed with the general planes of the hands at any angle from substantially horizontal to substantially vertical. The keyboard may be divided into left and right hand portions separately locateable on the user's working surface so that his arms may remain parallel. Keyboards with greater or lesser number of keys may take the same general form. Keyboards constructed as described above will be approximately half the size of conventional computer keyboards and contain one-fifth the number of keys, thus reducing manufacturing costs. The keys may be of the type making a distinct mechanical movement as used in conventional quality keyboards, or of any known alternative type such as a flexible membrane effecting electrical contacts, piezo-electric cells, means of detecting the surface conductivity or the capacitance of the hand, photocells occluded by the hand, and so on. In the absence of large reaches, means requiring but slight force and displacement may be preferred. Keyboards of the above described types might be manufactured in a range of sizes for different hands, as are gloves. A person might have his own familiar keyboard, which he plugged into whichever machine he was using. Personal keyboards might be made of fine wood or other substances desired by individuals or matching particular environments, thus enhancing their acceptability. Keyboards may be built into other objects, for example a keyboard divided into left and right hand portions may be built into the arms of a chair so that a desk becomes unnecessary.

In what follows, the term key press refers to the act of pressing a single key. The term key stroke refers to the act of pressing and subsequently releasing a single finger or thumb key or a group of such keys constituting a chord keystroke. A keystroke extends in time from the moment the first key is pressed to the moment the last key is released. It is the interval of time between two successive null states of the keyboard with no finger or thumb key pressed. The shift keys and shift locks must be operated so that the desired shift is in effect at the beginning of a keystroke.

A keyboard having eight keys for the fingers and thumbs of each hand and two keys for the heels of the hands is capable of registering 2 to the power 18 or 262,144 distinct states. Only a small proportion of these states are required to represent the usual character sets. The minimisation of the physical effort of operating the keyboard allows the valid states to be chosen with memorability as the primary consideration, and efficiency as a secondary though still important consideration. The familiar 80/20 rule may be applied, efficiency being served in the small proportion of the work where it really matters, and memorability being given full weight in the remaining large proportion of the work.

The valid keystrokes of the invention ae:
1. Any single finger or thumb key.
2. Any combination of one finger or thumb key of the left hand and one finger or thumb key of the right hand.
3. Selected other combinations of two or more finger or thumb keys.
4. Any of the above with the addition of either or both of the heel keys.

The strokes with a single finger or thumb key and those with one finger or thumb key of each hand may be represented by an at-least-notional matrix. In FIG. 5, the cell marked Z corresponds to the null state of the keyboard with no finger or thumb key pressed, the eight cells marked L to the pressing of a single finger or thumb key of the left hand, the eight cells marked R to the pressing of a single finger or thumb key of the right hand, and the remaining cells marked X to the pressing of one left hand finger or thumb key and one right hand finger or thumb key in combination. The five rows directly beneath the cell Z and the five columns directly to the right of the cell Z correspond to the home keys. Similar matrices may be drawn for keyboards having other numbers of finger and thumb keys. Any cell of a matrix could be assigned to the null state of the keyboard, but the assignment shown, with the above described relationship to the home keys, is preferred for keyboards used with Latin alphabets. Clearly and trivially, it would also be possible to represent the action of the keyboard by a matrix with axes reversed or by one tilted 45 degrees into a symmetric position. These however would be psychologically less effective with the proposed character assignment. The relationships between keyboard and matrix as defined above and with reference to FIG. 5 are assumed in subsequent figures.

The two heel keys used as shift keys singly or in combination select one of four matrices or cases. The four matrices may contain the lower case alphabet, the upper case alphabet, numerics, and machine control functions. Additional cases may be provided within the machine and attached temporarily to a shift in place of the usual case. For example, a compositor may use italics in place of numerics, or a computer programmer the reserved words of a programming language in place of lower case.

The assignment of the alphabet in the upper and lower alphabetic cases is identical so that the same fingering is used in either case, as with conventional keyboards. FIG. 6 shows one proposed assignment, having the five vowels AEIOU assigned to the home keys of the left hand, and the consonants to the key combinations which follow in sequence across the matrix. Letter A is obtained by pressing the left hand home thumb key. Letter B is obtained by pressing the left hand home thumb key as for letter A, together with the right hand home thumb key. Letter C is obtained by pressing the same left hand key together with the right hand index finger key, letter D similarly with the right hand middle finger key. Letter E is obtained by pressing the left hand index finger key. Letter F is obtained by pressing the left hand index finger key as for letter E together with the right hand home thumb key, and so on through to letter Z, obtained by pressing the left hand home little finger key as for letter U, together with the right hand home little finger key. This assignment gives a wholly consistant visual image in which the position of any letter in the matrix is easily seen. Alternatively, the encoding of any letter may be deduced logically. It is only necessary to remember that the vowels are obtained in alphabetic sequence by the left hand, and the consonants by selecting the preceding vowel in the alphabetic sequence with the left hand and then reciting the alphabet from that point on while marking across the right hand keys until the desired consonant is reached, or the next vowel if the starting vowel was wrongly chosen. The assignment of FIG. 6 thus fully attains for the alphabetic characters the objective of providing a coherant, easily remembered mental model. The beginner will be conscious of both the matrix as a visual image and the physical arrangement of the keyboard. With a little practice, the key press or combination of key presses required to indicate any cell of the matrix will become automatic and applicable to any of the cases. With further practice, the visual image in turn will largely recede from consciousness and the response to a desire to signal a certain letter or other common symbol become wholly automatic. The experienced user will key automatically for the most part, reverting to the level of the visual image only if automatic action fails, and to logical reasoning about the spatial relationships of symbols in the matrices only if he is not certain of the visual image. An important feature of the invention is that this reversion is possible, whereas with the QWERTY, Dvorak and like keyboards memory exists only at the psychokinetic level, and if this fails it is usually necessary to search the keyboard for the desired symbol because its largely random organisation does not facilitate visual memory.

Although the assignment of FIG. 6 fully meets the objective of memorability, it is not particularly efficient when the relative frequencies of the letters of the alphabet are considered. The vowels amounting to some 38% of average English text require only one key press, but the consonants amounting to some 62% require two key presses. While the data in various sources differs somewhat according to the nature of the text samples used, all sources agree that the five consonants HNRST are the most frequently occurring, amounting to some 35% of average English text, and that the difference in frequency of occurrance between the least frequent of these five and the sixth most frequent consonant is significant. FIG. 7 shows another assignment of letters to the alphabetic matrices in which H, N, R, S and T are assigned to the right hand home keys pressed alone. The remaining consonants are obtained by pressing one left hand and one right hand key as before. The English language has the useful property that the most frequently occurring consonants immediately precede vowels in the alphabetic sequence, so that the A, E, I, O and U rows of the matrix remain visually unbroken. With this assignment some 73% of the letters in average English text require only one key press. The arrangement is also fairly good with respect to the distribution of digrams, some 51% of consecutive letter pairs being given by consecutive single key presses of opposite hands. This measure is one of the most important with keyboards having one key for each character and machine function, because the large hand movements required must be overlapped for speed, but is less important with keyboards requiring only slight hand movements. In average text, the characters space, comma and period also occur with sufficient frequency for efficiency to be important. Space occurs more frequently than any single letter; comma and period rank about halfway down the letters. The remaining punctuation marks occur with insignificant frequency. In FIG. 8, three cells of the matrix are allocated to the space character. Space may be signalled by the left hand thumb alone, the right hand thumb alone, or both together. There is no advantage in using both thumbs to signal a single space, but it may happen accidentally, and this allocation ensures that a correct signal will be given. Normally one thumb or the other will be used as convenient, dividing the work between them. More than half of English words end with D, E, S, or T, and more than half begin with A, O, S, T or W, so the proposed allocation of the letters leaves one or other thumb free to move in anticipation of the space. Repeated spaces may be obtained immediately, without the auto-repeat delay time of conventional computer keyboards, by pressing one thumb key and at least one finger key of the same hand, or both thumb keys and at least one finger key, the frequency of repetition and therefore the speed of movement across the screen depending on the finger key or keys pressed. When setting out text, a required string of spaces may be signalled rapidly at first, slowing as the required number of spaces or final position is reached. The keyboard simulates the action of the hand drawing a line, and slowing as the desired end point is reached. Comma and period are allocated to single key presses, requiring however a moment to extend a little finger. The extension of the little finger serves usefully to punctuate the rhythm of the work in accordance with the rhythm of the text, thus giving weight to its meaning. The remaining punctuation marks are allocated to combination presses of a little finger of one hand and a finger of the opposite hand. The punctuation marks as a whole form a memorable arrangement. The same punctuation marks in the same arrangement may be provided on the lower and upper alphabetic cases and on the numeric case for memorability and ease of use, whereas on the QWERTY keyboard only the comma and period are generally available in both shifts.

FIG. 8 also shows a proposed allocation of two cells for the Auto-complete and Help functions if used. The Auto-complete function, when signalled instead of a normal space, completes the last word by reference to a stored dictionary, and inserts a space after it unless a punctuation mark follows. It is appropriate to locate this function near to the space character, and in the same position as the "Run" function in the control case described below. The "Help" function presents helpful information to a user who does not know what to do next. This function is appropriately located in a psychologically weak position related to the physical weakness of the little fingers and the spread hands gesture of helplessness. The auto-complete function may be provided on both alphabetic matrices, and the help function on all matrices.

FIG. 8 further shows the letters HNRST, allocated to single key presses of the right hand, resequenced to balance across the right hand the work on letters, space and punctuation marks. These five letters are now in an apparently arbitrary sequence. However, as they are frequently occurring letters their positions will be quickly learnt. The bulk of the letter assignment including the infrequently used letters continues to be visually logical and deducible by reasoning.

Table 1 shows the total loading on the fingers and thumbs obtained by summing the percentage frequencies of the letters, space, and punctuation marks across the rows and columns of the matrix of FIG. 8. The two motions of each thumb are counted separately and a reasonable distribution of space characters between the two thumbs is assumed. The grand total of 114 represents an average of 1.14 key presses per character, an increase of only 14% over the number of key presses required with a conventional keyboard, in return for which the reaches are eliminated and so the force and displacement required for each keypress can be much reduced. The work is evenly divided between the two hands, the right hand having 50.1% of the work. Corresponding fingers of the left and right hands are equally loaded. The right thumb has been given less work on its home key to free it for the majority of space characters. Table 2 compares this data, reduced now to a total of 100, with the digit loading of the QWERTY and Dvorak keyboards, and with data on finger strength and maximum tapping rate quoted in Alden et al (1972), also expressed on a base of 100. Space bar operations on the QWERTY and Dvorak keyboards have been assumed equally divided between the thumbs. The strength data quoted indifferently for a hand has been assumed to apply equally to the left and right hands. The keyboard of the present invention with the matrix of FIG. 8 compares favourably with the QWERTY keyboard on the distribution of the work across the digits, and is comparable with the Dvorak keyboard, which was specifically designed to achieve an efficient distribution as well as minimising reaches. The data on strength supports the Dvorak design and the present invention, the data on speed suggests that an electric keyboard requiring but slight key force may safely make rather more use of the ring and little fingers if required. The matrix of FIG. 8 allocates the five most frequent consonants to single key presses of the right hand. If the user forgets that these letters do not follow in sequence in the vowel rows an error will occur. In another form of the invention shown in FIG. 9, the matrix as implemented in the signal detection sub-system contains these consonants in both positions so that mistaken keyings will be accepted. In addition to its embodiment in the signal detection system, the matrix may have some embodiment visible to the user for training and reminder purposes. A computer program may display the matrix on part of the screen, highlighting the currently selected character for training purposes. A card may be supplied for reference. In such embodiments, the inefficient keyings of the five most frequent consonants would not be shown, and may be discouraged by blacking out those cells to strengthen the visual image as shown in FIG. 10.

FIG. 11 shows the visible form of the preferred matrix for the upper case. The layout of the letters is the same as in the lower case, as with conventional keyboards. A capitals shift lock function is provided at bottom left; keying this will alternately set and release the capitals shift lock within the signal detection system. Setting the capitals lock will release the numeric lock if set. With the capitals lock set, lower case is not available, upper case is available without actuating the upper case shift key, the numeric case is obtained by actuating the numeric shift key in the same way as from lower case, and the control case is obtained by actuating both shift keys, in the same way as from lower case. The required actuation may as described previously be either to press or to release the shift key, depending on whether the user wishes to rest the heels of his hands on the keyboard for most of the time. Additional infrequently used punctuation marks, printer's marks or other special symbols associated with running text may be provided in the so far largely unused topmost row and leftmost column of an alphabetic matrix. Such symbols may be provided in the upper case matrix only, to leave room for accents in the lower case matrix. From the previous description of alphabetic matrices for the English language, the general principles applicable to any language written with the Latin alphabet will be clear. The five vowels AEIOU are assigned to the left hand home keys in sequence, the remaining letters of the language are assigned to the vowel rows in alphabetic sequence, and the five most frequent consonants are also assigned to the right hand home keys, in the sequence which best balances the work of the right hand. With some languages, the suppression of the five most frequent consonants from the vowel rows of the visible matrix corresponding to FIG. 10 for the English language will break into these rows, weakening the visual image. To retain the strength of the visual image the five consonants placed on the top letter row may alternatively be selected only from the ends of the vowel rows at some slight sacrifice of efficiency. For users accustomed to working in two or more languages, matrices may include all the letters of the two or more languages in a combined alphabetic sequence, and the selection and sequencing of the five consonants of the top letter row may be based on combined frequency data. Matrices designed for use with one, two or more main languages and having the appropriate alphabetic sequence in the vowel rows and the appropriately selected and sequenced consonants assigned to the right hand home keys pressed alone may also be provided with additional letters in any convenient positions to enable their occasional use for keying other languages by persons not familiar with those languages. For example a matrix designed primarily for use with English, French and German may be provided with additional characters enabling its occasional use for Danish, Norwegian, Swedish and Icelandic. Table 3 shows selected frequency data for five European languages, taken from Einbinder (1973). Frequencies are expressed as a percentage of all letters and spaces, the punctuation marks and numerics amounting to 3% of average text being ignored. The total frequency of all vowels differs between the languages, and the more liquid languages such as French, Spanish and Italian will load the left hand more heavily with the vowels. Comparing Italian with English, the vowel loading on the left hand increases by 7.6%, the top five consonants loading on the right hand decreases by 2%, the remaining consonant loading requiring chord keying by the left and right hands together decreases by 4.6%, and the space loading, divisible between the hands at will, decreases by 1%. The overall effect is a reduction in the work due to an increase in the proportion of characters signalled by a single key press. The effect on the fingers of the left hand is an increase of 3% only, the increase in the vowel loading being offset by the decrease in the chord consonant loading. The effect will be less for languages of intermediate liquidity. The varying percentages of individual vowels in the five languages when contrasted with the data of Table 2 do not suggest any particular difficulty, falling well within the limits of acceptability as evidenced by the QWERTY keyboard. Thus, keyboards constructed according to the invention are likely to prove suitable for any language written with the Latin alphabet.

FIG. 12 shows a matrix with unspecified right hand home key consonants, and vowel rows appropriate to the major European languages, which is additionally provided with a comprehensive set of accents and extra letters enabling it to be used for keying any European language written with the Latin alphabet. The accents may be keyed before or after the letters to which they apply, and the letter and its accent translated by the signal detection subsystem into any required internal computer code. In a typewriter or other machine which printed immediately, the accent would be keyed before its letter and would function as a 'dead' character, that is one which does not advance the printing position across the paper. Dipthongs may be signalled by keying the two vowels making up a dipthong simultaneously, the signal detection subsystem assuming a particular sequence of the components, for example OE. Single stroke accented letter encoding may additionally or alternatively be provided to increase speed. In these codes, the accented letter is represented by the key or keys which would be pressed to represent the unaccented letter, together with one or more additional keys. The adjacent thumb keys which operate substantially at right angles to one another are preferably not used together because special key mechanism would be required to secure reliable action, and it is also not desirable to extend a little finger when the middle or ring fingers of the same hand are to be used. The encoding is preferably provided only for the main language or languages of the keyboard so that a simple code can be used. Accents foreign to the main language or languages of the keyboard may be signalled by a separate keystroke as before. FIG. 13 shows an accent coding scheme for the French language. The columns correspond to the right hand keys. The basic vowel symbol is keyed with the left hand, and the accent overcoded with the right hand, the same code being used for a given accent on all vowels. The right thumb may be thought of as 'holding' the vowel, so that the right finger does not indicate a consonant as it would if it alone were used with the vowel key. The accented C is keyed with the left thumb and right index finger as for the unaccented C, together with the right middle finger to signify the accent. Similar codes may be devised for any European language or group of languages.

In the numeric case, the ten digits of arithmetic are preferably assigned to the ten digits of the human hand as single key presses. Various arrangements are possible, and some of them are shown in Table 4. I is the sequence of the numeric keys in the cnventional QWERTY keyboard. The placement of 0 after 9 reflects the use of zero as a place value after other digits, and the fact that leading zeros are not generally required in running text. II has the mathematically more logical arrangement. Studies of the ten-key pads used on calculators and telephones have shown that it is better to place 0 near 1, at least on rectangular key arrays. Both I and II have the disadvantage that figure 0 is given to a little finger. 0 occurs much more frequently than the other digits, indeed mechanical calculating machines were often provided with keys for indicating 00 and 000. The arrangement III of the Dvorak keyboard overcomes this problem at the cost of a less obvious distribution of the digits. Marsan proposed arrangement IV, having observed that untutored children counting on their digits invariably begin with a thumb representing 1, generally the right thumb, proceed from there across the chosen hand, and then on to the other hand, beginning with the thumb taking value 6. His scheme again allocates 0 to a little finger. Scheme V allocates 0 to a thumb, and is mathematically more correct. Extensive experimentation would be required to determine the best of these arrangements.

FIG. 14 shows a proposed numeric case having the numbers arranged as in scheme V of Table 4. Any other arrangement may be used. The punctuation marks are provided in the same positions as in the alphabetic cases since many of them are used with numbers or numeric codes. The usual arithmetic and logical operators, brackets and other symbols associated with numbers and calculations are provided in a memorable arrangement. The X symbol represents any desired currency symbol. A numeric shift lock function is provided at bottom left, keying this will alternately set and release the numeric lock in the machine. Setting the numeric lock will release the capitals lock if set. With the numeric lock set, lower case alphabetics are unavailable, the numeric case is available without actuating the numeric shift key, the upper alphabetic case is obtained by actuating the upper case shift key in the same way as from lower case, and the control case is obtained by actuating both shift keys in the same way as from lower case. The required actuation may as described previously be either to press or to release the shift key, depending on whether the user wishes to rest the heels of his hand on the keyboard for most of the time.

Figures 16, 17, 18, 19, 20, 21:
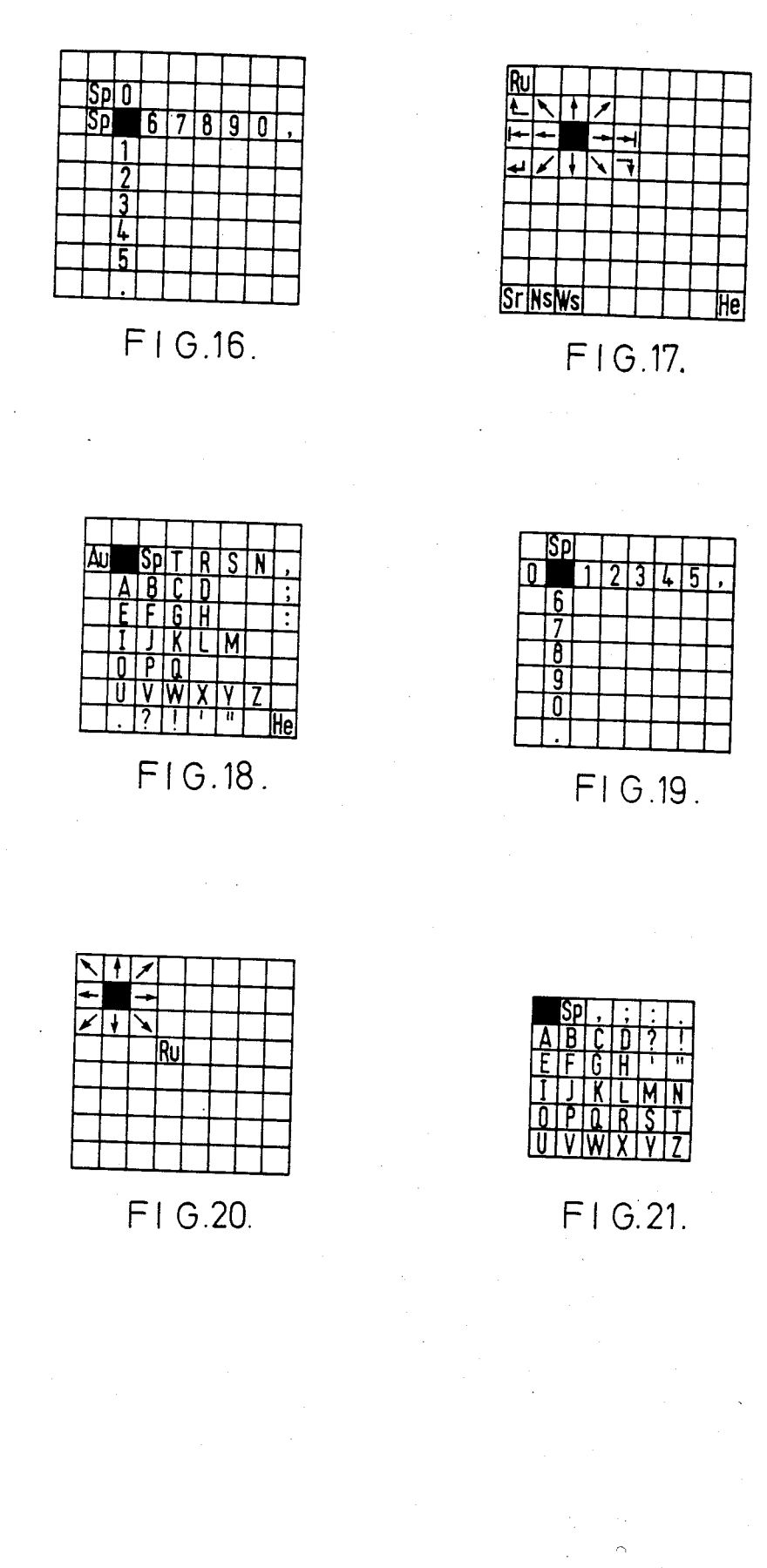

FIGS. 15 and 16 show two preferred arrangements for the numeric case, having the digits 1 to 9 arranged in accordance with Marsan's observation, a 0 placed after 9 as in the conventional QWERTY keyboard, and an additional 0 placed before the 1, for operation by the same thumb as works the 1. One space cell is lost, but two remain. In these schemes, zero both precedes and follows the digits 1 to 9. Multiple zeros may be signalled with a single keystroke, the thumb operating the 0 positioned before the 1, and one or more fingers of the same hand indicating the required number of zeroes, depending on the finger key or keys pressed. The remaining details may be as in FIG. 14.

FIG. 17 shows a proposed matrix for the control case. The null state of the keyboard with no finger or thumb key pressed is assigned to the same cell of the matrix as on the alphabetic and numeric cases for visual consistency and physical relationship with the thumbs. It is surrounded by eight cursor movement cells. The left hand home thumb key moves the cursor down, the left hand thumb key adjacent to the home key moves the cursor up. The right hand home thumb key moves the cursor to the right, the right hand thumb key adjacent to the home key moves the cursor to the left. Pressing one of these thumb keys of each hand moves the cursor at an angle.

Repeated vertical movement may be induced by pressing a left hand thumb key and one or more left hand home finger keys together, the frequency of repetition and therefore the speed of vertical movement depending on the finger key or keys pressed. Repeated horizontal movement may be induced by pressing a right hand thumb key and one or more right hand home finger keys together, the frequency of repetition and therefore the speed of horizontal movement depending on the finger key or keys pressed. Repeated movement at an angle may be induced by pressing one thumb key of each hand and one or more finger keys of each hand. The vertical speed will depend on the left hand finger keys pressed and the horizontal speed will depend on the right hand finger keys pressed, so that movement at any angle may be achieved. A required cursor movement may be made rapidly at first and in an approximate direction, the speed being reduced and the direction corrected as the required final position is approached. The keyboard cursor control functions thus simulate the natural action of the hand when making any movement, such as positioning a mouse or puck. FIG. 17 also shows in the leftmost column the "Run" function, the "Home", "Tab Backward" and "Newline" cursor control functions and the "Shift Reverse" function, in the second column from the left the "Normal Sound" function, in the third column the "Warning Sound" function, in the fifth column the "Tab Forward" and the "End of Text" cursor control functions, and at the bottom right the "Help" function as previously described. The "Run" function, variously titled Do, Enter, Execute or Run on conventional computer keyboards, initiates a predefined computer action, for example to read and process a screen of input data. The location of this function, obtained by extending both thumbs from their usual position, minimises the risk of accidentally keying the function and initiating an undesired computer action. Repeated newlines may be induced with the left hand finger keys as for the eight basic cursor moves. The "Shift Reverse" function operates the machine switch which reverses the action of the shift keys, enabling the user to rest his hands on the keyboard when keying the lower case alphabet or to hold them up as he prefers. The location of this function corresponds to those of the Shift Lock functions on the capital and numeric matrices. The "Normal Sound" function operates the machine switch which turns on and off the aural feedback from a correct keystroke, the "Warning Sound" function operates the machine switch which turns on and off the aural feedback from an incorrect keystroke such as signalling one of the five consonants allocated to the right hand alone by a combination keystroke, or any key or combination of keys for which no decode is provided.

The eight basic cursor movement cells may be shifted by additional coding to enable the information plane to be moved relative to the physical screen. In a preferred form, the shift is effected by pressing the extended little finger key in addition to one or more thumb keys of a hand. The index finger at least will still be available to effect repeated movement.

The above described forms of the invention are appropriate for work which can be done effectively with digital input of positional data. For work requiring analogue input of positional data, the above described keyboards for digital data entry may be combined with analogue devices for generating rate or displacement data. The analogue device may be of any known form such as a set of four buttons corresponding to the four directions of movement, which cause movement at a speed depending on the force with which they are pressed, a swash plate which can be tilted in any direction and causes movement in a corresponding direction on the screen at a speed depending on the force applied to tilt it, a control column or joy-stick which can be moved in any direction and causes movement in a corresponding direction on the screen at a speed depending on the displacement of the column, a tracker ball which can be rotated in any direction and causes movement in a corresponding direction on the screen with a displacement proportional to the rotation of the ball, or a mouse or puck which can be moved in any direction on a plane surface and causes movement in a corresponding direction on the screen with a displacement depending on the displacement of the mouse or puck.

In one form of the invention, a set of four buttons, swash-plate, joystick, tracker ball or other analogue device is located centrally on the keyboard. In other forms, the digital keyboard or part thereof is built into the analogue device or part thereof; for example the whole keyboard may move bodily on a support surface, acting as a mouse. Digital signals may be used to enable or disable the analogue input and the physical movement of the whole keyboard.

In a "reduced" form of the invention, the alphabetic matrices may have the space character allocated to a right hand home key pressed alone, apart from the shift keys. The keyboard need only have 16 keys, and the positioning of the home thumb key and adjacent thumb key of each hand substantially at right angles which is desirable when the space character is allocated to an extended thumb key is not required. FIG. 18 shows an alphabetic matrix having the space character and four high frequency consonants allocated to right hand single key presses. The vowels, remaining consonants, punctuation marks etc. are positioned as before. FIGS. 19 and 20 show numeric and control matrices for a 16-key keyboard. Further reductions are possible. FIG. 21 shows an alphabetic matrix requiring only a 12-key keyboard, including the shift keys. Forms with 16 or fewer keys, located substantially in one plane, may be preferred to reduce the size and cost of the keyboard. The average number of keys pressed per character is increased however, and the work is poorly distributed across the hands.

Figure 22:
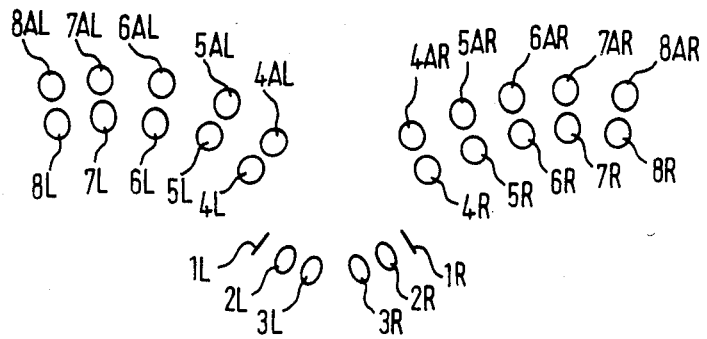
FIGS. 22 and 23 illustrate two further embodiments of the keyboard.

In "enhanced" forms of the invention, the keyboard may be provided with additional keys or key actions. Two rows of finger keys may be provided as shown in FIG. 22 so that the index, middle and ring fingers operate two keys each by a short and direct reach forward and backward, without any lateral movement of these fingers such as causes the difficulty of learning the conventional QWERTY keyboard. The little fingers may be similarly provided with two keys for the home positions and two keys for the extended positions. The additional row of keys 4AL-8AL, 4AR-8AR for each hand may be placed above or below the main row. The additional keys may be operated instead of or in addition to corresponding keys of the main row. Alternatively, there may be only a single row of keytops for each hand, each keytop actuating two keyswitches by distinct motions such as a press against a light spring followed by a press against a stronger spring, or a press for one action and a rocking or wiping motion for the other action. The secondary signal may be given instead of or in addition to the primary signal, being distinct in either case. Similarly the home thumb key of each hand may be duplicated or provided with two distinct motions, as may the non-home thumb keys. Alternatively, the non-home thumb keys adjacent to respective home thumb keys in the main key row may be used as the duplicates of the home keys, and the space character and zero which they produce in the 18-key form of keyboard transferred to the other non-home thumb keys nearest the midline of the keyboard. This option is shown in FIG. 22. In these keyboards, the 18 keys corresponding to the 18-key form of the keyboard function as previously described. The additional 12 keys or key actions function similarly, so that in the alphabetic shifts left hand keys signal the vowels, right hand keys signal the common consonants, and combinations of one left hand and one right hand key signal the remaining consonants. Punctuation, numerics and so on may also be signalled on the additional keys in the same way as on the main keys. If the additional keys are used, the finger key or keys which signal a given character in the additional row are directly in line with the keys which signal that character in the main row, and the additional thumb key is similarly reached with an easy move from the home thumb key of the main row. If one keytop with two motions is used, the same keytops are used to signal a given character with either the main or the additional keyswitches. In all cases, the selected character when keyed on the additional row or with the additional motion will automatically be accompanied by a space character.

Figure 23:
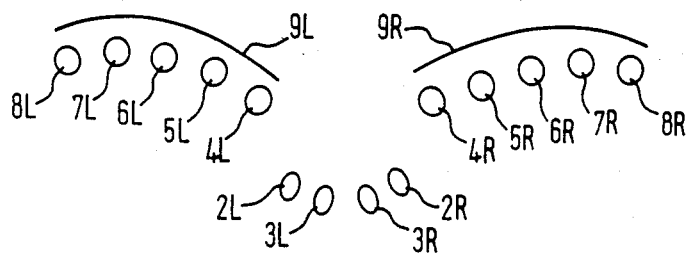

Instead of 10 or 12 additional keys or key actions, the keyboard may be provided with one or more elongate keys resembling the space bar of a conventional QWERTY keyboard, placed near to the main key row so that a digit may operate a key of the main row and an elongate key in the same action, causing the selected character to be accompanied by a space character. The elongate key or keys may be placed above or below the main row of keys and may extend along all or part of it. FIG. 23 shows a keyboard having 18 keys, comprising for each hand two thumb keys 2L, 3L, 2R, 3R, five finger keys 4L-8L, 4R-8R, one elongate key 9L, 9R extending over the finger keys, and one heel key Z. The four shifts are selected by the heel keys. Letters, punctuation marks, numbers and other characters are selected by the home thumb keys and the finger keys as previously described. The same characters accompanied by the space character are selected by thumbs and/or fingers with essentially the same encoding, the thumbs pressing the non-home thumb keys and the fingers pressing the finger keys together with the elongate space keys. Space as a single character is signalled by pressing a space bar alone. Immediate repeat space may be obtained by pressing simultaneously the non-home thumb key and the elongate key of one hand, together with finger keys of the same hand to indicate the frequency of repetition. In the control shift, cursor movement is effected as described previously using the home and non-home thumb keys to control direction and the finger keys to control speed. The 'Run' function may be obtained by pressing simultaneously both heel keys and both elongate keys but no other keys.

With "enhanced" forms of the invention in which the signal decoding system is arranged to produce the selected character followed by a space character, the additional row or motion or the elongate key may be used for the last letter of a word, the last digit of a number, or a punctuation mark, to signal the space which follows it without a separate keystroke. With "enchanced" forms in which the signal decoding system is arranged to produce a space character followed by the selected character, the additional row or motion or the elongate key may be used for the first letter of a word or the first digit of a number to signal the space which precedes it without a separate keystroke. The latter arrangement may be psychologically preferable as the requirement for a space character comes first and may more effectively stimulate the use of the additional row or motion or the elongate key. It also accords better with practice in ordinary cursive handwriting, in which space is left before a word rather than after it. This arrangement also has the mechanical advantage that it may not be necessary to provide a duplicate key or second motion for the non-home little finger keys, as comma and period are not usually preceded by a space. If exceptionally one is, a space may be signalled separately. Other punctuation marks such as quote marks or dashes may be preceded by a space, but these are signalled by combination keypresses of a little finger of one hand and a digit of the other hand other than its little finger, and the space requirement may be signalled by this other digit actuating the additional row or motion or elongate key.

With all these "enchanced" forms of the invention, the work of the thumbs is halved, the number of keystrokes for a given text reduced by nearly 25% and the overall speed in terms of words per minute correspondingly increased. The average number of keys pressed per character including space is only 0.89, compared with 1.00 for the QWERTY, Dvorak or Maltron keyboards, 1.14 for the 18-key form of the invention, and 1.82 for the Microwriter. Since the encoding is almost identical to that for the basic mode of operation, the additional learning required to achieve this benefit is small.

The basic signal detection requirement for any chord keyboard is to detect keystrokes comprising one, two or more digit key presses. Since the user is unlikely to depress two or more keys exactly together or release them exactly together, the signal detection system must capture as a group all key presses signalled between two successive null states of the keyboard with no digit key pressed. The determination of the code signalled must be made at the end of the keystroke when all the component key presses are known. In user terms, the desired character appears on the screen, or machine function executes, when he releases the keys, not when he presses them as with a conventional keyboard. It follows that a chord keyboard cannot provide "roll-over", the ability of a conventional computer keyboard to detect overlapping single keystrokes and interpret them as successive signals. The user must therefore strike the keys cleanly, as with a manual typewriter. With a keyboard requiring no large reaches, and but slight key actuating force and displacement, clean fingering should not be difficult.

The characters to be detected may include single letters, numbers, punctuation marks and other special symbols, diphthongs, accents overcoded on a letter within one keystroke, and accents coded as separate keystrokes. Multiple zeroes may be signalled with a single keystroke. There may be a signal requiring the character to be accompanied by a space. The machine functions to be detected may include Run, Help and cursor movement functions. An auto-repeat function may be provided, a keystroke held for more than a certain time being decoded before the release of the keys, it being assumed that the user has established his desired combination of key presses, and the character or machine function signalled being emitted repeatedly at a certain frequency until the keys are released. The proposed immediate repeat variable speed cursor movement, information plane movement and space encodings require the detection of particular signals as soon as they are established in a keystroke. The fully formed signals are unique in the encoding scheme as are all the proposed codes, but ambiguities will exist in some cases while the combination of key presses is being established. The Newline function and the four diagonal cursor movement functions require a combination of two thumb keys and one or more finger keys. Since the thumb keys will not in general be pressed at exactly the same moment, signals requiring immediate horizontal or vertical cursor movement will exist briefly, and could cause undesirable effects. There are no codes in the proposed coding scheme other than immediate action codes which when incomplete equate to an immediate action code, and incomplete signals not recognised as requiring immediate action are no problem. Siebel (1972) quotes Klemmer as finding that users can press multiple keys within 30 milliseconds. Conrad and Longman (1965) allowed 50 ms and obtain a 1% error rate with trainee operators. It is proposed therefore that the signal detection system shall impose a delay of the order of 50–100 ms to almost eliminate unexpected cursor movement. This delay is still much shorter than the normal auto-repeat delay of some 500 ms, necessary to distinguish for any character or machine function the intent to repeat from a slow and indecisive keying intended as a single character or machine function, and the movement obtainable with the "immediate" function is also several times faster.

An invalid keystroke may usefully cause the emission of a space, so that the error may be corrected by overwriting or deleting rather than by inserting. The error may additionally be signalled by highlighting or by the emission of a sound. Sound effects resembling key clicks may be desired when valid keystrokes are detected, at least during the initial learning period. Two distinctive sounds may be emitted to indicate single key strokes and chord keystrokes. These sounds may be a single note and a chord.

Figure 24:
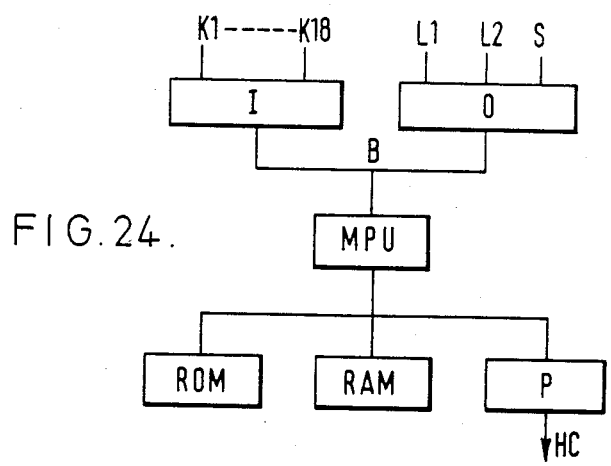
FIG. 24 is a block schematic diagram of the keyboard decoding means.
Figure 25:
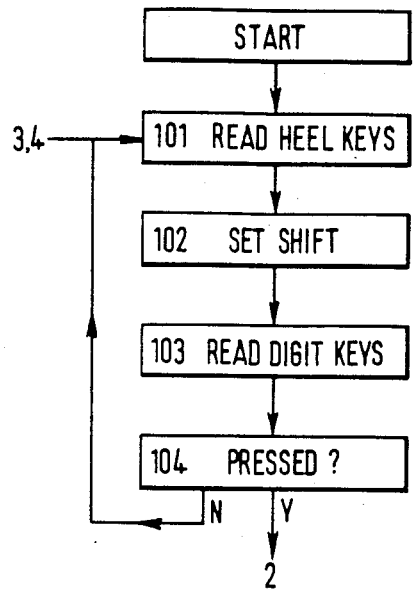
FIGS. 25 to 28 show a flow chart illustrating operation of the decoder.

The implementation of these signal detection requirements using a dedicated microprocessor is a matter of known art, and is outlined here solely for the convenience of the constructor. In FIG. 24, K1 to K18 represent the eighteen keys of one form of the keyboard. L1 and L2 are the LEDs indicating which shift is in effect, and S is a sound generator. I is an input port or ports of at least 18 bits, O is an output port or ports having at least 2 bits to drive the LEDs and as many more as are required to signal pitch and duration to the sound generator. Lines B represent the internal bus structure of the microcomputer, MPU is a microprocessor, ROM a read only memory, RAM a read/write memory, and P an output port sending data to the host computer HC or other information processing device. I, O and P may be combined in the form of one or more Programmable Interface Adaptors. In small personal computers, MPU and HC may be the same processor, and P is then not required. ROM contains a keyboard polling program and code conversion tables, and may usefully be of the plug-in variety so that the keyboard may be readily adapted to different character sets or command codes. RAM will contain transient data. For "enhanced" forms of the invention, the input port I may have up to 30 bits and all decoding may be performed by software; alternatively the signals from the additional key or key motions may be diode encoded onto the lines from the main keys or key motions and onto an additional line conveying the space requirement. The form of keyboard with elongate keys will signal directly onto this additional line.

The program stored in ROM and executed by MPU is described below and with reference to the outline flowcharts FIGS. 25–28 and Table 5. The program comprises four blocks, which respectively determine the shift in effect, acquite the data from a digit keystroke, and output in the immediate repeat and deferred output modes. At start-up, MPU begins executing Block 1, FIG. 25. At 101 the program reads port I to obtain the heel key data, then 102 if the shift reverse flag is set, the heel signals are reversed. If lower case alphabetic is signalled and the shift lock is set to upper case or numeric the lock overrides the input signal. A code indicating the shift in effect is stored, and data output to port O to illuminate L1 for upper case, L2 for numeric case, and both for control case. At 103 the program reads port I again to obtain the digit key data, and 104 the block repeats until a digit key is pressed, when control passes to Block 2.

Figure 26:
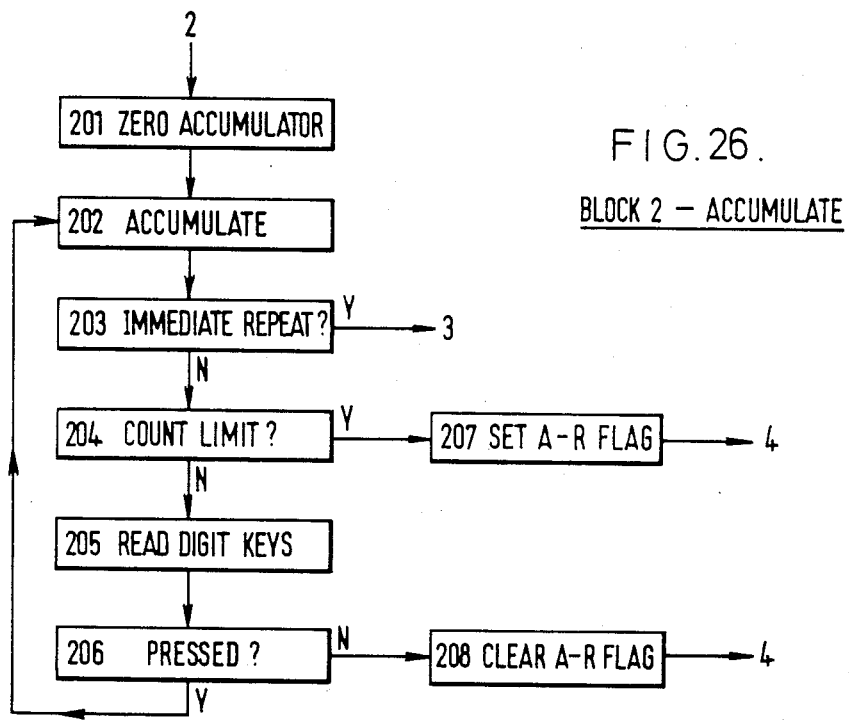

Block 2, FIG. 26, begins by 201 zeroing an accumulator, then 202 writes the latest digit key data into the accumulator with a logical AND operation. Until one of the exit conditions is satisfied, the block then repeats, 205 reading digit key data and 202 ANDing it into the accumulator, which thus builds a record of all digit keys pressed during the keystroke from the moment the first digit key is pressed to the moment that one of the conditions for ending the loop is detected. The loop ends 203 if one of the key combinations indicating an immediate repeat requirement is detected, control then passing to Block 3, 204 if the loop count limit is reached, corresponding to the end of the suitable delay time, control then passing to Block 4 with 207 the auto-repeat flag set, or 206 if all digit keys have been released, control then passing to Block 4 with 208 the auto-repeat flag cleared. The conditions for immediate repeat are given in Table 5, which is a truth table. The third line for example asserts that one of the conditions for immediate repeat is that in the lower or upper case alphabetic shifts, the left hand and the right hand non-home thumb keys adjacent to respective home thumb keys are pressed, together with at least one left hand home finger key, irrespective of whether any right hand home finger keys are also pressed.

Figure 27:
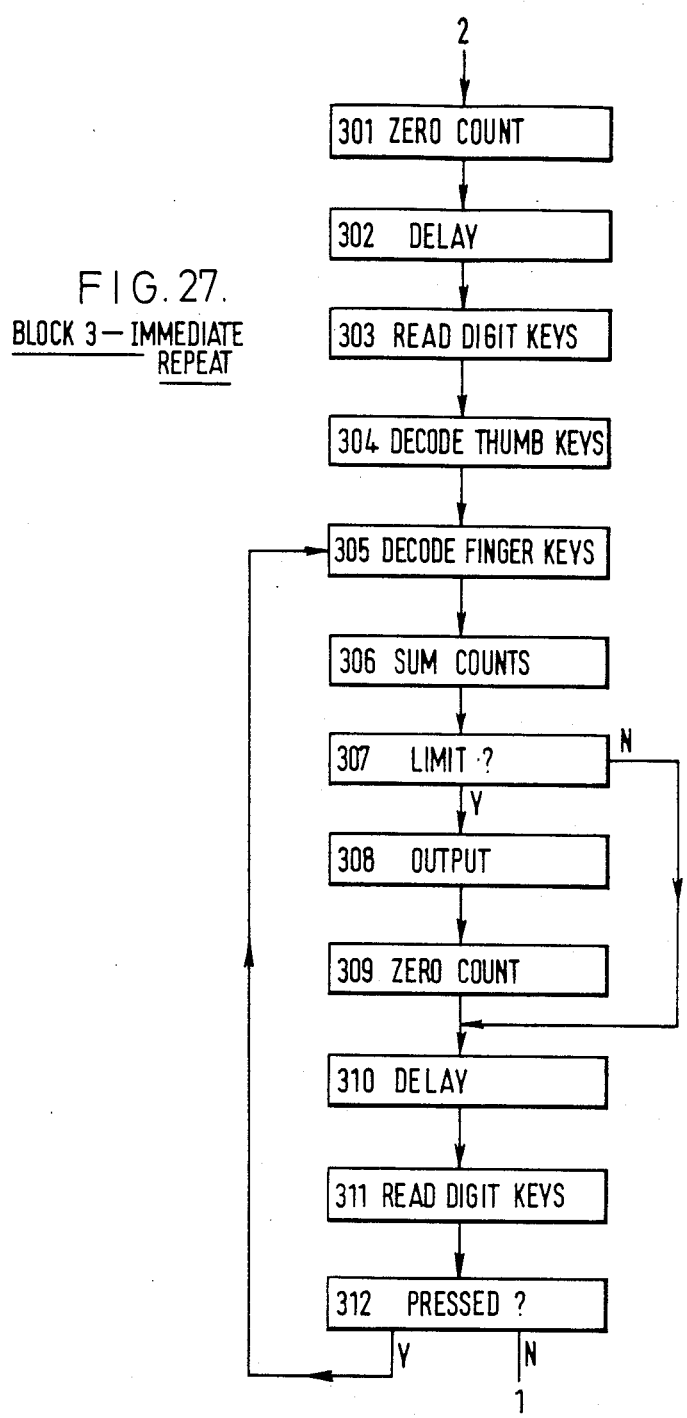
Figure 28:
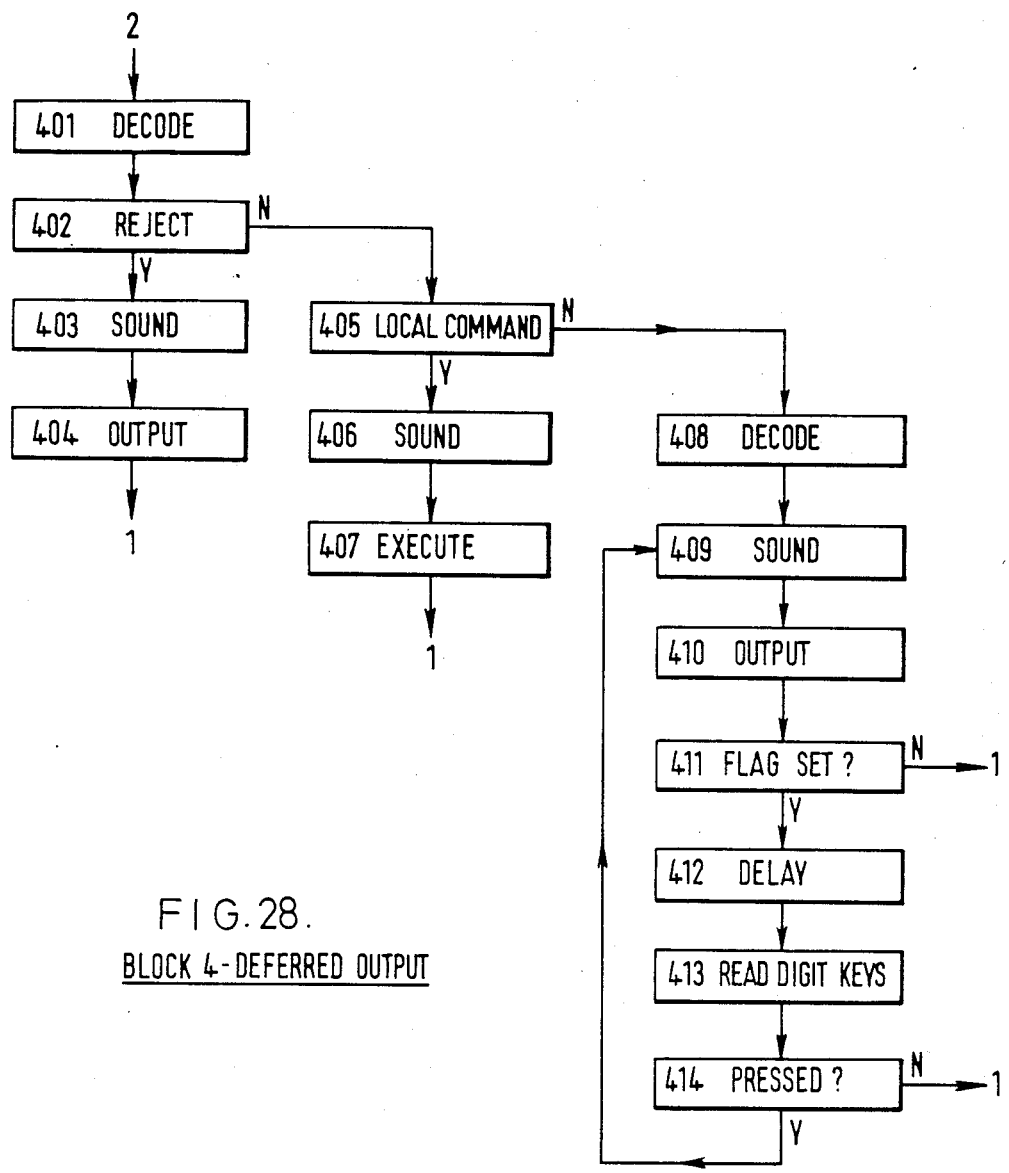

Block 3, FIG. 27, is invoked when an immediate repeat condition has been detected. It begins 301 by zeroing counts for the vertical and horizontal movements, then 302 delays for some 50 milliseconds to allow for ragged key depression and 303 reads the digit keys again to obtain a stable reading. It then 304 decodes the thumb keys according to the shift in effect to identify repeat cursor movement, Newline or Space. For cursor movement this reading gives the quadrant of the movement, that is the directions of the vertical and horizontal components of the movement. The decoding is performed by scanning the digit key data to identify for each hand that one of the keys pressed which lies nearest the middle of the keyboard, and deriving row and column arguments for a table lookup. If no key is pressed by one hand, then row or column 3 is assumed, in conformity with the matrix of FIG. 5. Depending on the shift code stored by Block 1, one of four decode tables is then accessed. The entries in this table are ASCII codes for characters, and codes for the various commands, both those executed by the keyboard processor MPU and its program, and those sent to the host computer HC for it to execute. One of the local commands is a reject code, placed in all cells of the table which do not correspond to valid keystrokes. For cursor movement the program 305 scans the left hand home finger key data to identify that one of the keys pressed which lies furthest from the midline of the keyboard, and 306 adds to the vertical movement count 1 for the index finger through 4 for the little finger, and similarly with the right hand finger data for the horizontal movement. For Newline only the left hand data is scanned and for Space only the right hand data is scanned. When 307 a count reaches a set limit, 308 a vertical cursor move, horizontal cursor move, newline or space code is output to port P and 309 the count is zeroed. Thus the local command for cursor movement at an angle reaches HC as a series of vertical and horizontal moves. If with thumb keys denoting cursor movement the left hand non-home little finger key is pressed, then the vertical move is output to HC as a vertical information plane move rather than a cursor move, and similarly with the right hand non-home little finger key for the horizontal move. At 310 the program delays to give an appropriate overall cycle time, then 311 reads the digit keys again to obtain new speed information from the finger keys and 312 repeats the speed decoding and output operation until all digit keys are released, the directional information established at 304 remaining unaltered for the duration of keystroke. At the end of the keystroke control reverts to Block 1. If no immediate repeat requirement is detected, Block 4, FIG. 28, is invoked at the end of the auto-repeat delay time, or if all digit keys are released before the end of the auto-repeat delay time. It begins 401 by scanning the digit key data as in Block 3 to identify the keys pressed nearest the midline of the keyboard and performing the table lookup. If 402 the table entry is the reject code then 403 data is sent to port O to cause the sound generator S to emit a warning sound, provided that the warning sound flag is set, and 404 a space character is output to port P for the use of HC, so making corrections easier. If 405 the table entry is a local command other than the reject code, then 406 data is sent to port P to cause S to emit a 'normal keystroke' sound, provided that the normal sound flag is set, and 407 the local command is executed. This command may set or clear the warning sound flag, the normal sound flag, the shift reverse flag, or the shift lock code. It is executed once only to avoid confusion, even though auto-repeat has been forced by the keyboard operator. If the table entry is not a local command, then 408 further decoding may be undertaken. In the alphabetic shifts, specific tests may be performed for bit patterns representing diphthongs or overcoded accents, and if found the output string extended appropriately. In the numeric shift, if zero has been keyed with the right thumb, the right hand home finger key data is scanned to identify that one of the keys pressed which lies furthermost from the midline of the keyboard, and the output string extended to 2, 3, 4 or 5 zeroes as required. In the control shift, if the thumb data indicates a vertical cursor move and the left hand non-home little finger key has been pressed, an information plane move is coded instead of a cursor move, and similarly for a horizontal move if the right hand non-home little finger key has been pressed. Then 409 the 'normal keystroke' sound is emitted as before, and 410 the output string is sent to port P character by character. At 411 the auto-repeat flag is tested and if clear the block ends. If set, then 412 a delay occurs to give an appropriate auto-repeat frequency, and then 413 the digit keys are read again and 414 while any digit keys are pressed the cycle of 'normal sound' and string output repeats at the set frequency. The output string remains that determined by steps 401 and 408 even if some digits are then added to or taken away from the keypress. When all digit keys are released the auto-repetition ceases. When the block ends at 404, 407 or 414, control reverts to Block 1.

In the program as described, all codes sent to the host computer may auto-repeat. It may alternatively be arranged that some codes such as Help and Execute are sent once only to obviate undesirable action by the host computer.

The program required by the "enhanced" forms of the invention is substantially identical to that described. At the end of the keystroke accumulation process Block 2 the bit pattern is tested for use of the additional keys or key motions. If used a flag is set to indicate that a space must be output, then the additional bits are ANDed with the corresponding bits of the data from the main key row or key motions and the decode processing proceeds as described. At the output stage 410 the selected character is output, preceded or followed by a space character. In the case of the keyboard with elongate space bars, the space flag is set if either space bar or either non-home thumb key is pressed. The truth table of Table 5 will also differ slightly.

I claim:

1. A keyboard comprising:
 a plurality of keys arranged in a left hand group and a right hand group as viewed by an operator, each group including five home keys comprising a thumb key, an index finger key, a middle finger key, a ring finger key and a little finger key; and
 wherein each of said left hand group and said right hand group further includes five additional keys comprising an additional thumb key, an additional index finger key, an additional middle finger key, an additional ring finger key, and an additional little finger key disposed adjacent and corresponding to said home thumb key, said home index finger key, said home middle finger key, said home ring finger key, and said home little finger key, respectively;
 decoding means for producing a signal representative of one of the vowels A, E, I, O and U in response to operation of one of said thumb key, said index finger key, said middle finger key, said ring finger key, and said little finger key, respectively, of said left hand group, for producing a signal representative of each one of sixteen consonants in response to simultaneous operation of the home key of said left hand group corresponding to the alphabetically preceding vowel and the respective home key of said right hand group taken in order from the thumb key to the little finger key corresponding to the relative position of the consonant in a string of consecutive consonants following the alphabetically preceding vowel, for producing a signal representative of each of the other five consonants in response to operation of only a respective single home key of said right hand group; and for producing a signal representative of a space character accompanied by a signal representative of the vowels A, E, I, O, and U in response to operation of said additional thumb key, said additional index finger key, said additional middle finger key, said additional ring finger key, and said additional little finger key, respectively, of said left hand group, for producing a signal representative of a space character accompanied by a signal representative of each of the other five consonants in response to operation of only a respective single additional key of said right hand group, and for producing a signal representative of a space character accompanied by a signal representative of each of the sixteen consonants in response to simultaneous operation of the additional key of said left hand group corresponding to the alphabetically preceding vowel and the respective additional key of said right hand group taken in order from said additional thumb key to said additional little finger key corresponding to the relative position of the consonant in the string of consecutive consonants following the alphabetically preceding vowel.

2. A keyboard comprising:

a plurality of keys arranged in a left hand group and a right hand group as viewed by an operator, each group including five home keys comprising a thumb key, an index finger key, a middle finger key, a ring finger key and a little finger key; and decoding means for producing a signal representative of one of the vowels A, E, I, O, and U in response to operation of one of said thumb key, said index finger key, said middle finger key, said ring finger key, and said little finger key, respectively, of said left hand group, for producing a signal representative of each one of sixteen consonants in response to simultaneous operation of the home key of said left hand group corresponding to the alphabetically preceding vowel and the respective home key of said right hand group taken in order from the thumb key to the little finger key corresponding to the relative position of the consonant in a string of consecutive consonants following the alphabetically preceding vowel, and for producing a signal representative of each of the other five consonants in response to operation of only a respective single home key of said right hand group; and wherein each of said home keys is adapted for operation in an additional mode, said decoding means being adapted for producing a signal representative of a space character accompanied by a signal representative of one of the vowels A, E, I, O, and U in response to operation in said additional mode of one of said thumb key, said index finger key, said middle finger key, said ring finger key, and said little finger key, respectively, of said left hand group, for producing a signal representative of a space character accompanied by a signal representative of each of the other five consonants in response to operation in said additional mode of only a respective single home key of said right hand group, and for producing a signal representative of a space character accompanied by a signal representative of each one of the sixteen consonants in response to simultaneous operation in said additional mode of the home key of said left hand group corresponding to the alphabetically preceding vowel and operation in said additional mode of the respective home key of said right hand group taken in order from said thumb key to said little finger key corresponding to the relative position of the consonant in the string of consecutive consonants following the alphabetically preceding vowel.

3. A keyboard comprising:

a plurality of keys arranged in a left hand group and a right hand group as viewed by an operator, each group including five home keys comprising a thumb key, an index finger key, a middle finger key, a ring finger key and a little finger key; and decoding means for producing a signal representative of one of the vowels A, E, I, O, and U in response to operation of one of said thumb key, said index finger key, said middle finger key, said ring finger key, and said little finger key, respectively, of said left hand group, for producing a signal representative of each one of sixteen consonants in response to simultaneous operation of the home key of said left hand group corresponding to the alphabetically preceding vowel and the respective home key of said right hand group taken in order from the thumb key to the little finger key corresponding to the relative position of the consonant in a string of consecutive consonants following the alphabetically preceding vowel, and for producing a signal representative of each of the other five consonants in response to operation of only a respective single home key of said right hand group; and wherein each of said left hand group and said right hand group further includes five additional keys comprising an additional thumb key, an additional index finger key, and additional middle finger key, an additional ring finger key, and an additional little finger key disposed adjacent and corresponding to said home thumb key, said home index finger key, said home middle finger key, said home ring finger key, and said home little finger key, respectively, said decoding means being further adapted for producing a signal representative of a space character accompanied by a signal representative of one of the vowels A, E, I, O, and U in response to simultaneous operation of one of said home thumb key and said additional thumb key, said home index finger key and said additional index finger key, said home middle finger key and said additional middle finger key, said home ring finger key and said additional ring finger key, and said home little finger key and said additional little finger key, respectively, of said left hand group, for producing a signal representative of a space character accompanied by a signal representative of each of the other five consonants in response to simultaneous operation of only a respective single home key and a respective corresponding single additional key of said right hand group, and for producing a signal representative of a space character accompanied by a signal representative of each one of the sixteen consonants in response to simultaneous operation of the home key and the additional key of said left hand group corresponding to the alphabetically preceding vowel and the respective home key and the respective additional key of said right hand group taken in order from said home thumb key and said additional thumb key to said home little finger key and said additional little finger key corresponding to the relative position of the consonant in the string of consecutive consonants following the alphabetically preceding vowel.

* * * * *